(12) United States Patent
Cudak et al.

(10) Patent No.: US 6,801,512 B1
(45) Date of Patent: Oct. 5, 2004

(54) METHOD AND APPARATUS FOR PROVIDING A DISTRIBUTED ARCHITECTURE DIGITAL WIRELESS COMMUNICATION SYSTEM

(75) Inventors: Mark Cudak, McHenry, IL (US); Amitava Ghosh, Vernon Hills, IL (US); Brian K. Classon, Stremwood, IL (US); Robert T. Love, Barrington, IL (US); Louay Jalloul, Palatine, IL (US); Robert S. Nikides, Carol Stream, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/534,421

(22) Filed: Mar. 23, 2000

(51) Int. Cl.[7] .................................................. H04Q 7/00
(52) U.S. Cl. ...................................... 370/332; 370/331
(58) Field of Search ................................. 370/332, 331, 370/329; 455/435.1, 435.2, 446, 67.13, 502, 452; 375/267, 299, 347

(56) References Cited

U.S. PATENT DOCUMENTS

| | | | | |
|---|---|---|---|---|
| 4,901,307 A | * | 2/1990 | Gilhousen et al. ............ 370/320 |
| 5,548,808 A | | 8/1996 | Bruckert et al. |
| 5,590,133 A | * | 12/1996 | Billstrom et al. ............ 370/349 |
| 5,742,592 A | * | 4/1998 | Scholefield et al. ......... 370/329 |
| 5,752,193 A | * | 5/1998 | Scholefield et al. ...... 455/452.2 |
| 5,754,542 A | * | 5/1998 | Ault et al. .................... 370/342 |
| 5,784,362 A | * | 7/1998 | Turina ......................... 370/321 |
| 5,931,964 A | * | 8/1999 | Beming et al. .............. 714/748 |
| 6,049,534 A | * | 4/2000 | Sakamoto et al. ........... 370/331 |
| 6,070,085 A | * | 5/2000 | Bender et al. ............... 455/522 |
| 6,167,031 A | * | 12/2000 | Olofsson et al. ............ 370/252 |
| 6,246,880 B1 | * | 6/2001 | Iizuka ......................... 455/446 |
| 6,252,868 B1 | * | 6/2001 | Diachina et al. ............ 370/347 |
| 6,269,250 B1 | * | 7/2001 | Bender et al. ............... 455/522 |
| 6,275,488 B1 | * | 8/2001 | Cudak et al. ................ 370/347 |
| 6,289,008 B1 | * | 9/2001 | Sakamoto et al. ........... 370/331 |
| 6,374,112 B1 | * | 4/2002 | Widegren et al. ......... 455/452.2 |
| 6,385,451 B1 | * | 5/2002 | Kalliokulju et al. ......... 455/437 |
| 6,456,858 B1 | * | 9/2002 | Streter ...................... 455/552.1 |
| 6,473,399 B1 | * | 10/2002 | Johansson et al. ........... 370/229 |
| 6,473,442 B1 | * | 10/2002 | Lundsjo et al. .............. 370/537 |
| 6,493,322 B1 | * | 12/2002 | Chennakeshu et al. ..... 370/252 |
| 6,587,446 B2 | * | 7/2003 | Sarkar et al. ................ 370/331 |
| 6,594,241 B1 | * | 7/2003 | Malmlof ...................... 370/329 |
| 6,603,751 B1 | * | 8/2003 | Odenwalder ................. 370/331 |
| 6,614,810 B1 | * | 9/2003 | Lee et al. .................... 370/471 |

OTHER PUBLICATIONS

Resequencing delay and buffer occupancy in selective repeat ARQ with multiple receivers, Shacham, N.; Towsley, D.; □□ INFOCOM '88. Networks: Evolution or Revolution? Proceedings. IEEE , Mar. 27–31, 1988, Page(s): 515–524.*

A selective–repeat–ARQ protocol for parallel channels and its resequencing analysis. Shacham, N.; Shin, B.C.; □□ Communications, IEEE Transactions on , vol.: 40 Issue: 4, Apr. 1992, Page(s): 773–782.*

(List continued on next page.)

Primary Examiner—Wellington Chin
Assistant Examiner—Jamal A. Fox

(57) ABSTRACT

A mobile station (402) selects (1802) a preferred cell site for transmitting a frame of data to be sent subsequently to the mobile station. A base station (602) of the preferred cell site schedules (1804) a transmission of the frame of data, wherein parameters for the transmission are determined by the base station from recently-measured channel and interference information. Thereafter, the base station sends (1806) the frame of data from the preferred cell site; and an active set of base stations associated with the mobile station at ones of a plurality of cell sites synchronize (1808) their data queues to reflect the transmission of the frame of data.

24 Claims, 8 Drawing Sheets

OTHER PUBLICATIONS

An asymmetric, dynamic, energy–conserving ARQ protocol. Redi, J.; Petrioli, C.; Chlamtac, I.; ☐☐ Vehicular Technology Conference, 1999 IEEE 49th , vol.: 1 , May 16–20, 1999. Page(s): 732–736 vol. 1.*

Energy–conserving go–back–N ARQ Protocols for wireless data networks Chlamtac, I.; Petrioli, C.; Redi, J.; Universal Personal Communications, 1998. ICUPC '98. IEEE 1998 International Conference on , vol.: 2 , Oct. 5–9, 1998. Page(s): 1259–1263 vol. 2.*

Energy–conserving selective repeat ARQ protocols for wireless data networks. Chlamtac, I.; Petrioli, C.; Redi, J.; Personal, Indoor and Mobile Radio Communications, 1998. The Ninth IEEE International Symposium on ,vol.: 2 , Sep. 8–11, 1998,pp.: 836–840.*

Resequencing delay and buffer occupancy in selective repeat ARQ with multiple receivers, Shacham, N.; Towsley, D.; INFOCOM '88. Networks: Evolution or Revolution? Proceedings. IEEE , Mar. 27–31, 1988, Page(s): 515–524.*

A selective–repeat–ARQ protocol for parallel channels and its resequencing analysis. Shacham, N.; Shin, B.C.; Communications, IEEE Transactions on , vol.: 40 Issue: 4, Apr. 1992, Page(s): 773–782.*

An asymmetric, dynamic, energy–conserving ARQ protocol. Redi, J.; Petrioli, C.; Chlamtac, I. Vehicular Technology Conference, 1999 IEEE 49th , vol.: 1 , May 16–20, 1999. Page(s): 732–736 vol. 1.*

"Narrow DS–41 Air Interface Specification", Version 0.6, Amitava Ghosh and Louay Jalloul, Dec. 29, 1999, USA.

"High Data Rate (HDR) Technology," Revision 1.7, Qualcomm, Inc. Mar. 1999, USA.

* cited by examiner

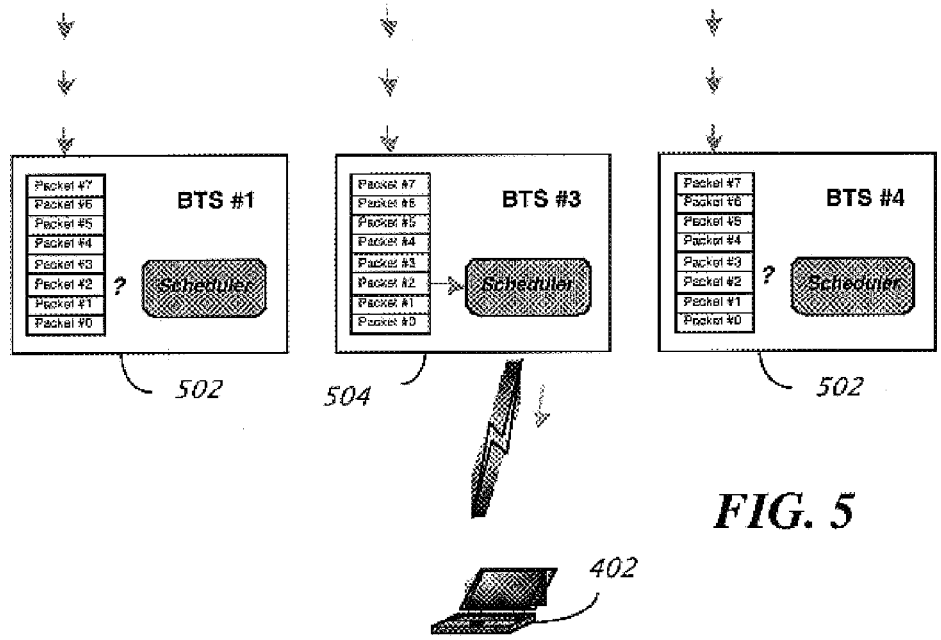
FIG. 5
| Frame N-3 | Frame N-2 | Frame N-1 | Frame N |
|---|---|---|---|
| Pilot Strength of BTS in active set measured and BTS selected | Mobile transmits BTS selection on reverse FCSS channel (R-TSICH) | BTS selects the MCS level and calculates the schedule for next frame | Data is transmitted on forward data channel (F-SCH) |
FIG. 9
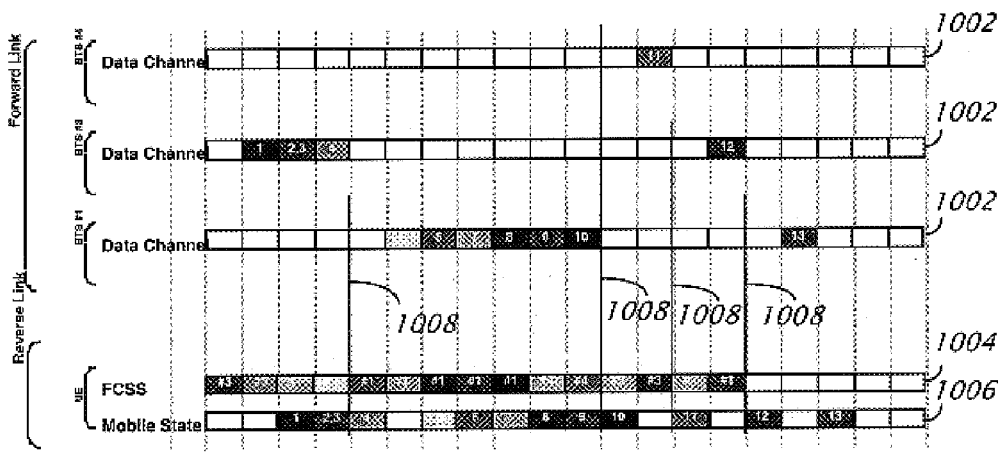
FIG. 10

*602*

*402*

US 6,801,512 B1

METHOD AND APPARATUS FOR PROVIDING A DISTRIBUTED ARCHITECTURE DIGITAL WIRELESS COMMUNICATION SYSTEM

FIELD OF THE INVENTION

This invention relates in general to wireless communication systems, and more specifically to a method and apparatus for providing a distributed architecture digital wireless communication system.

BACKGROUND OF THE INVENTION

Current CDMA systems implement soft handoff, where a mobile station (MS) communicates with multiple base transceiver stations (BTS) simultaneously during a transition from one cell to another. However, since multiple BTSs transmit to a single MS, soft handoff, in many real-world cases of interest, either wastes system capacity or creates additional interference on the forward link. Fast cell site selection (FCSS) eliminates the soft handoff by switching the forward link from the first BTS to the second BTS very quickly such that only one BTS transmits to a MS at any given point in time.

The challenge with FCSS is that the packet data for the MS queued at the first BTS must be available at the second BTS so that the packet data flow to the MS is seamless. Any delay in continuing the packet flow may result in a loss of system capacity or throughput, and the repetition of packets will result in a loss of system capacity and increased interference. The key to the success of FCSS is therefore to make the packets directed from the network to the MS available at both BTSs, and to keep the packet queues synchronized such that the FCSS is as seamless as possible.

Prior art systems have used a centralized architecture in which the scheduling of data packets and the Automatic Repeat reQuest (ARQ) function have been performed in a central controller. This centralized architecture imposes more delay than is desirable for FCSS (or any scheme using soft handoff). Thus, what is needed is a new architecture for a digital wireless communication system that will reduce the scheduling and ARQ delays observed in the prior art centralized systems.

BRIEF DESCRIPTION OF THE DRAWINGS

FIG. 5 illustrates a queue synchronization problem.

FIG. 9 depicts the timing of the FCSS measurement process and selection in accordance with the present invention.

FIG. 10 illustrates the timing of the mobile state relative to the forward link data transfer and FCSS, in accordance with the present invention.

DETAILED DESCRIPTION OF THE DRAWINGS

This disclosure describes two new distributed network architectures that offer several advantages. The first architecture moves the data packet scheduling to the edge of the network to eliminate backhaul delay, a critical step for adaptive modulation and coding (AMC) methods. For this distributed architecture, two primary methods of packet queue synchronization are provided. The second architecture distributes the Automatic Repeat reQuest (ARQ) function along with the data packet scheduling to reduce ARQ feedback delay. The second architecture reduces the memory costs of the ARQ, enabling Hybrid ARQ methods. Several additional methods of ARQ synchronization are then provided for this case.

The terminology and language used to describe Fast Cell Site Selection (FCSS) are similar to that used for soft handoff. The mobile station (MS) and the network keep track of an active set and neighbor set for the MS. Any one of the base transceiver stations (BTSs) in the MS's active set can be selected by the mobile station to transmit for a given frame interval. The network communicates a new neighbor list of base transceiver stations (BTS) based on both the mobile station's current active set and given new candidate BTS or BTSs it is considering to add to the mobile's active set. Such candidate and current active set sites' pilot strengths are communicated by the MS to the active set BTSs via a pilot strength update message. Such pilot strength update messages are sent when neighbor list pilots with sufficient strength are detected by the MS such that they are considered candidates for the active set. Neighbor sets can also be updated based on a MS's position and knowledge of the system topology. The network insures that data destined for the mobile is available at all BTSs in the active set, and the MS selects one BTS from the active set based on channel measurements, and signals its selection on the reverse link. The primary difference between FCSS and soft handoff is that a decision must be made to enter and leave soft handoff—a MS can be in soft handoff for a very long time under the wrong channel conditions. The cost in system capacity or interference to perform FCSS is fixed and small, while the cost for soft handoff is unknown and on average larger, especially for stationary users. With FCSS, the forward link from the old BTS stops and the forward link from the new BTS starts in a deterministic fashion.

Figure 1:
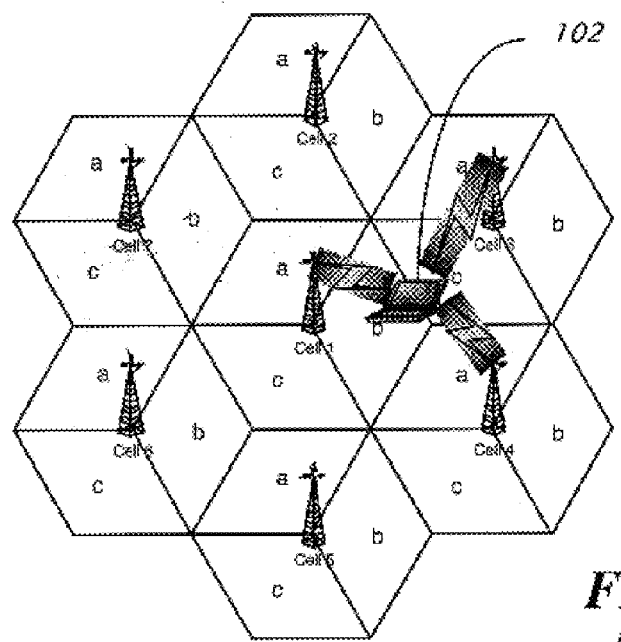
FIG. 1 is a diagram depicting a typical prior-art cellular system.
Figure 2:
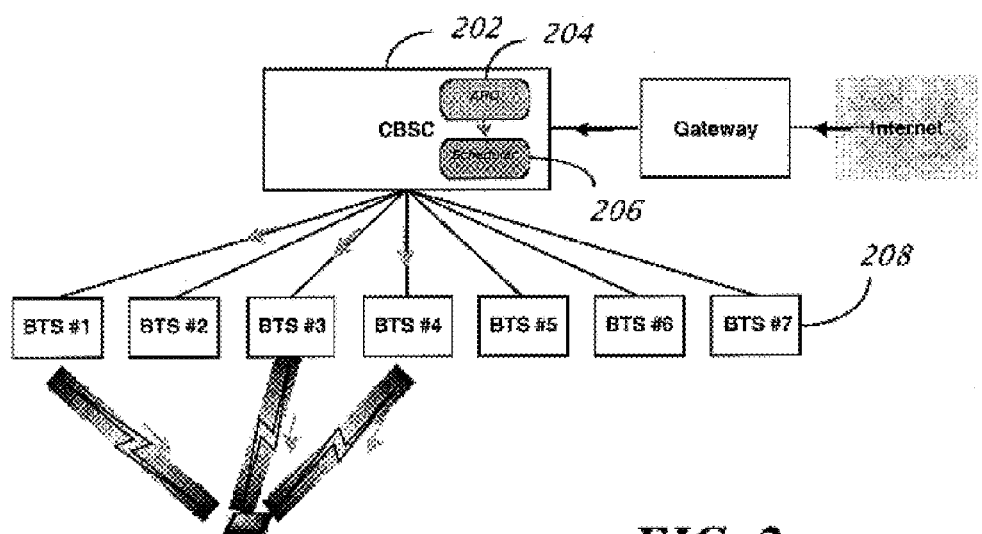
FIG. 2 is a block diagram of a prior-art hierarchical network.

A typical prior-art cellular system is depicted in FIG. 1 showing seven three-sector cells. The data user 102 in cell 1-b is in a 3-way soft handoff with sectors from cells 3-c and 4-a. In other words, sectors 1-b, 3-c, and 4-a are in the active set of the data user. FIG. 2 shows how those users may be served with a prior-art hierarchical network consisting of a central base site controller (CBSC) 202 coupled to base transceiver stations (BTSs) 208 at each cell site. The CBSC 202 includes an ARQ function 204 and a scheduler 206. With soft handoff, the CBSC 202 generates fully formatted radio frames by selecting the transmission rate according to current channel conditions and segmenting the data traffic to a size appropriate for the air interface at the selected transmission rate. The CBSC 202 then distributes the identical radio frames to all serving BTS 208 in the active set (in this example, BTS #1, BTS #3, and BTS #4). These BTSs 208 then simulcast the pre-formatted radio frames.

Figure 3:
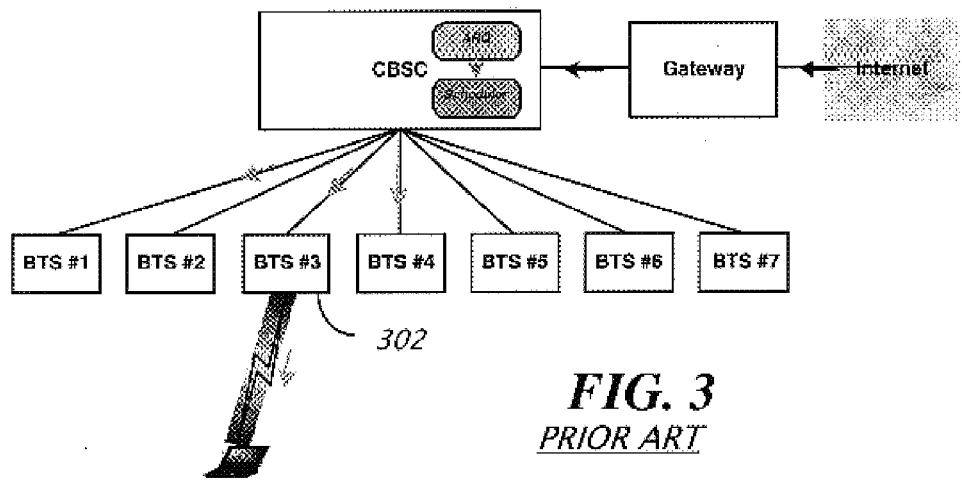
FIG. 3 is a prior-art hierarchical network providing fast cell site selection.

In contrast, FCSS selects only one BTS 208 in the active set to transmit (in this case monocast) the radio frame. (In the development that follows, no distinction is made between switching between cells and switching between sectors. For sector-to-sector handoff, the backhaul delay is considered approximately zero.) As channel conditions change, FCSS will switch between the BTSs 208 in the active set. The selection process is typically mobile controlled and is fairly rapid. FIG. 3 shows a prior-art hierarchical network providing FCSS. The system in FIG. 3 differs from FIG. 2 by providing a gating function in the BTSs such that the radio frame is transmitted by one BTS 302 in the active set and discarded by all other BTSs.

Two new distributed network architectures that support FCSS are proposed that move either the scheduling or both the scheduling and ARQ to the BTS. FCSS allows scheduling to be moved to the BTS because the radio frame is being monocast instead of simulcast as with soft handoff. The monocast radio frame no longer has to be identical or time-aligned with the other BTSs in the active set, which allows the packet scheduling to be moved to the edge of the network.

Figure 4:
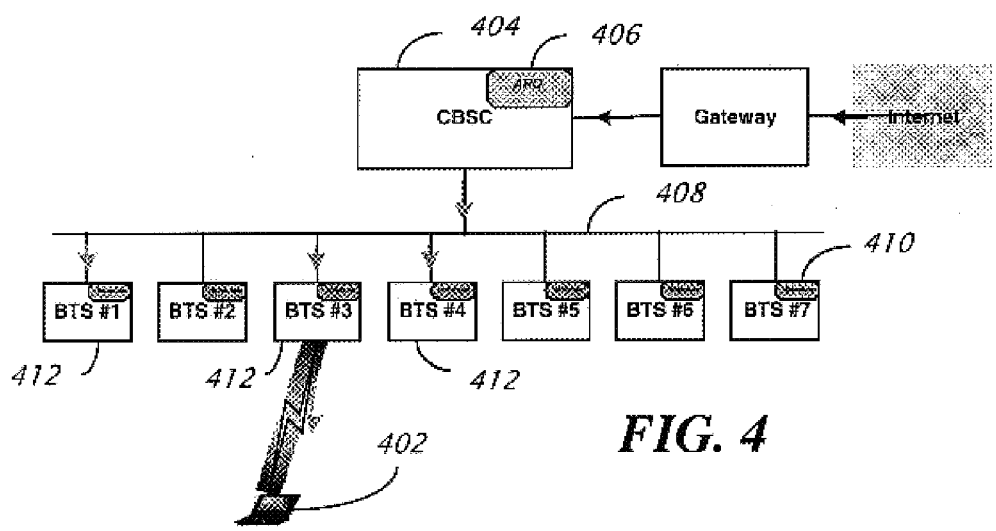
FIG. 4 depicts a first embodiment of a distributed network architecture in accordance with the present invention.

FIG. 4 depicts a first embodiment of a distributed network architecture in accordance with the present invention, in which the scheduling function 410 resides at each BTS. Since connectivity between neighboring BTSs is required in this architecture, the backhaul is illustrated as a shared bus topology 408. Packets, e.g., from the Internet, and not formatted radio frames, are multicast to all BTSs 412 in the active set. (The term "packet" can refer to any uniquely sequenced protocol unit, whether radio link control blocks, bytes, or IP packets.) Conceptually a central authority such as the CBSC 404 is still required to manage the active set and provide the ARQ function 406. However, these functions can be combined with the gateway function or integrated into the edge router connecting to the Internet.

The advantage of moving the scheduling to the BTS is the elimination of backhaul delay. Without the backhaul delay, the BTS can use the most recent channel information in scheduling. The reduced feedback delay is especially critical in systems employing "fat-pipe" techniques using variable spreading factors and/or adaptive modulation and coding, where a low-feedback delay helps to track the channel and interference. Link throughput and system capacity are maximized by selecting transmission rates that match the most recent channel and interference estimates and available transmit power. However, different traffic patterns (users with packets to be served) and different channel and interference environments within each cell cause data to be transferred at different rates from each BTS in the active set. Therefore, the distributed architecture requires that queues at each BTS be synchronized so those packets are not repeated unnecessarily when a mobile switches between BTSs in the active set. Several solutions to this issue are addressed further herein below.

Synchronizing the queues of the serving BTSs is a critical issue with a distributed scheduler architecture. Each BTS 412 in the active set (BTS#1, #3, and #4 from FIG. 4) is part of a multicast group receiving all of the mobile station's packets from the CBSC, and each BTS maintains an identical queue of packets destined to the mobile station. The MS 402 preferably selects the serving BTS 412 from those in the active set through a fast uplink transmission sent every frame. The scheduler at the BTS 412 selects to send, once per frame, one or multiple packets in any radio frame depending on the current channel conditions and available power. FIG. 5 illustrates the queue synchronization problem described above. When the BTS 504 has sent a packet and received an acknowledgment from the MS 402, e.g., packet #2, the other BTSs 502 in the active set need to be informed, so they can synchronize their queues with that of BTS 504. The two primary methods for synchronizing the queues, backhaul and over-the-air, are described further herein below.

In the first embodiment, all packets preferably contain unique sequence numbers that are visible to layer two of the communication protocol. In addition, a Selective Repeat ARQ is used with the ARQ function located in the network. A centrally located ARQ is reasonable when the ARQ feedback delay (and window size) is large. Note that, in this embodiment, the cell site that receives the ACK (if any) associated with the transmission preceding the switch is unimportant as long the ACK that contains the feedback for that transmission eventually makes it to the network. Because retries are inserted into the packet flow at the CBSC, the ARQ does not need to be handed off to the new cell.

Figure 6:
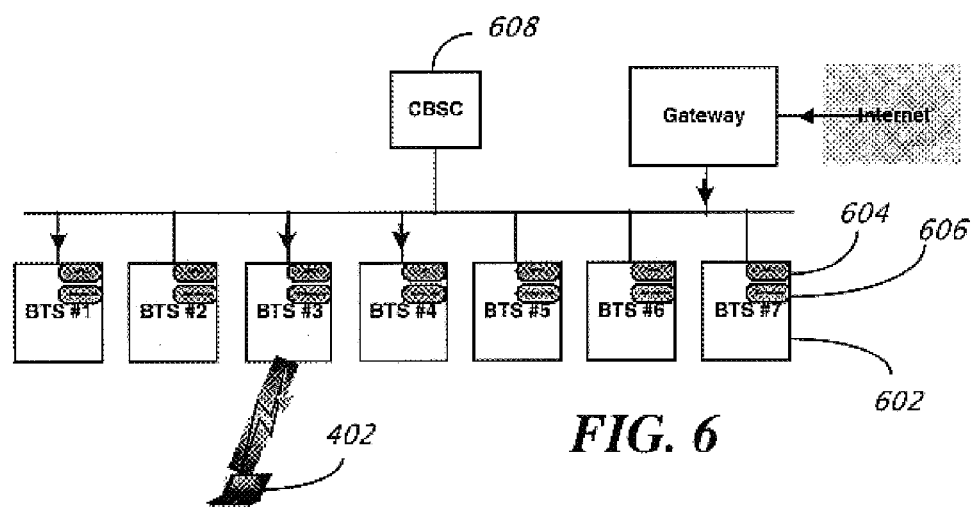
FIG. 6 depicts a second embodiment of a distributed network architecture in accordance with the present invention.

In addition to allowing scheduling to be moved to the BTS, FCSS allows the ARQ function to be moved to the BTS. FIG. 6 depicts a second embodiment of a network architecture in accordance with the present invention. In the second embodiment, both the scheduler 606 and the ARQ function 604 are distributed in the BTSs 602. The CBSC 608 remains with reduced functionally. For FCSS, the CBSC 608 is responsible for managing mobility by defining the members of the active sets and coordinating the multicast groups. IP packets are multicast directly to the BTSs 602 in the active set.

The advantage of moving the ARQ function to the edge of the network is that ARQ feedback delay is greatly reduced. Reducing the ARQ delay greatly reduces the MS memory required for traditional selective-repeat ARQ methods, especially with Hybrid ARQ. Reducing this delay also enables the system to generically support IP traffic with quality of service constraints, including future real-time services. However, in addition to queue synchronization, ARQ synchronization is now required between BTSs in the active set. How the queue and selective repeat ARQ synchronization can be integrated for a selective repeat ARQ and for Hybrid ARQ will be described further herein below.

Figure 7:
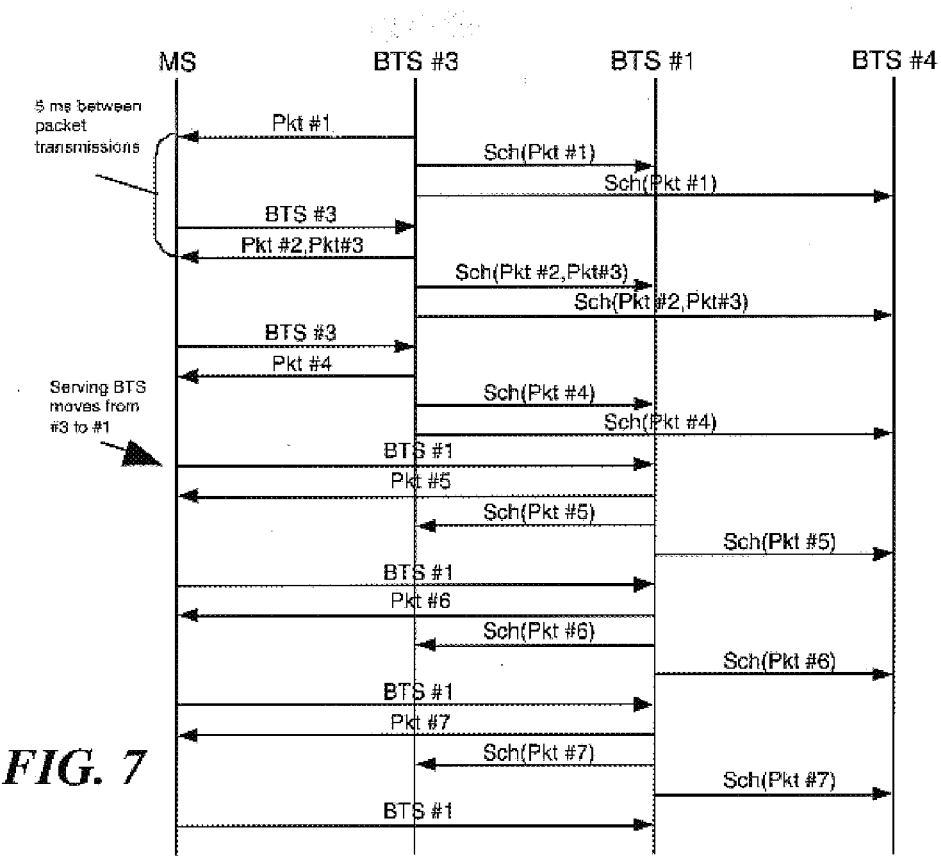
FIG. 7 depicts a message sequence diagram in accordance with the present invention.

In one embodiment, the state of the BTS queue is communicated from the serving BTS 602 to all BTSs 602 in the active set via backhaul multicast. The communication occurs once per scheduling interval (e.g., once per frame). FIG. 7 depicts a message sequence diagram (MSD) of the communication between the MS 402 and BTSs 602 in the active set, in accordance with the present invention. For the first four packets, the BTS#3 is the serving BTS. Simultaneous with each packet transmission, BTS#3 informs the other BTSs 602 in the active set of the packets transmitted. The MS 402 selects a new serving BTS 602 after the third packet transmission. The new serving BTS#1 is able to seamlessly continue the sequence of packets based on the previous information received over the backhaul.

Figure 8:
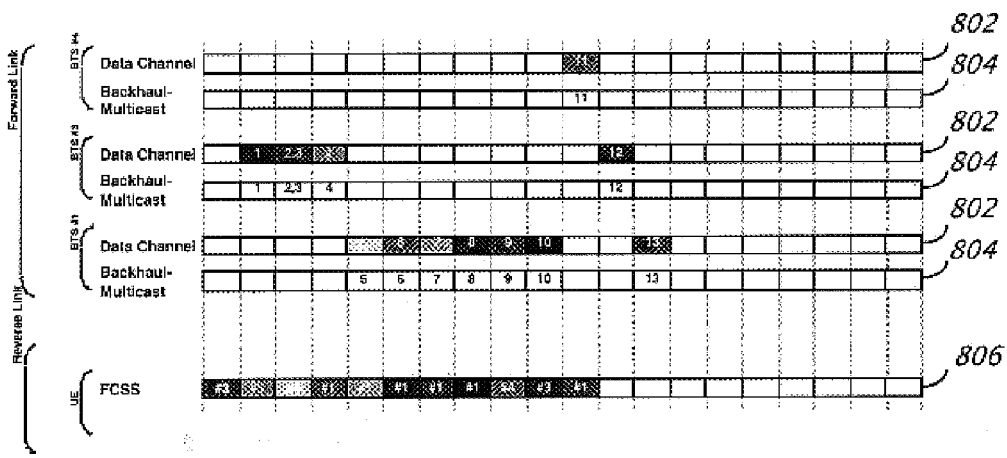
FIG. 8 presents fast cell site selection signaling and data transfer in accordance with the present invention.

FIG. 8 presents FCSS signaling and data transfer in accordance with the present invention on a single timing diagram. The data channel 802 carries packet data on the forward link. The backhaul multicast 804 sends the current schedule to the active-set BTSs 602. The FCSS 806 selects the best cell two frames in advance. On the top of the diagram the timing of the forward link data and the backhaul multicast of three BTS transmissions are illustrated. On the bottom of the diagram, the reverse link timing is illustrated showing the FCSS decision of the mobile. The numbered slots represent the mapping from FCSS decisions to forward link transmissions (F-SCH), which follow the FCSS decision by two frames. It will be appreciated that the delay can be less than two frames if the MS site selection and scheduling are combined into one frame. For FIG. 8 it is assumed that multicast updates and the scheduling of the next transmission can occur within the current transmission—a reasonable assumption for a 10+ Mbps backhaul.

FIG. 9 depicts the timing of the FCSS measurement process and selection for data transmitted in frame N, in accordance with the present invention. In frame N-3, the mobile station measures the pilot strength of all BTSs in the active set and selects the best one (subject to predefined hysteresis). The MS 402 then transmits its BTS selection on the reverse FCSS channel in frame N-2. In frame N-1, the desired BTS 602 selects the modulation and coding scheme (MCS) level and calculates the schedule. Finally, the data is transmitted on the forward data channel from the desired BTS 602. (It will be appreciated that, alternatively, it may be possible to compress the transmission on the FCSS channel and BTS scheduling process so they occur within the same frame, reducing the whole process to three frames instead of four.) The backhaul multicast technique for scheduler synchronization advantageously provides a simple, elegant solution to BTS synchronization. The BTSs 602 remain synchronized without any packet repetition or gaps. The technique does, however, require a high backhaul bandwidth for low latency.

Alternatively, the state of the mobile station can be transferred over the air (OTA) to the BTSs 602 of the active set. In this embodiment, the BTSs 602 rely on feedback from the MS 402 to determine what packet was transmitted last. The MS 402 preferably communicates several different and complementary pieces of information about recent transmissions, e.g., the last received packet, all correctly received packets including gaps, the current MCS level, and (in systems having asynchronous cells) the differential timing offset between the old and new cells. Obviously, the frequency and the amount information per transfer will need to be minimized in order reduce overhead. The transfer can occur during the cell selection message or in a separate message. In one embodiment, the messages are transmitted only during a cell switch. Timing of the cell site selection will likely be simultaneous with or precede the final packet transmission from the old serving BTS. Therefore, the information in the transfer is not current, with a one-frame mobile state lag in the mobile state transferred during the cell selection.

FIG. 10 illustrates the timing of the mobile state relative to the forward link data transfer and FCSS, in accordance with the present invention. The Data Channels 1002 illustrate packet data on the forward link. The FCSS 1004 indicates the mobile station's selection of the best cell two frames in advance. The Mobile State 1006 communicates the last packet received by the MS 402. Cell switches are indicated by the vertical lines 1008. Note that the Mobile State 1006 always lags the forward link by one frame (assuming negligible demodulation time). Since the last frame transmitted from the old serving BTS 602 may be destined for the desired MS 402 at the previous MCS level, for the desired MS 402 at a new MCS level, or for another MS 402 entirely, the new serving BTS 602 cannot be certain of the precise packet to begin transmission. The new serving BTS 602 will require additional information to overcome the ambiguity and avoid duplicate transmissions and missed packets. One solution to this problem is for the new serving BTS 602 to estimate the number of packets the old BTS 602 transmitted during the mobile state lag, schedule packets that could not duplicate packets from the old BTS, and then let the ARQ protocol identify any skipped packets (e.g., from the holes in the next selective repeat ACK-map).

Figure 11:
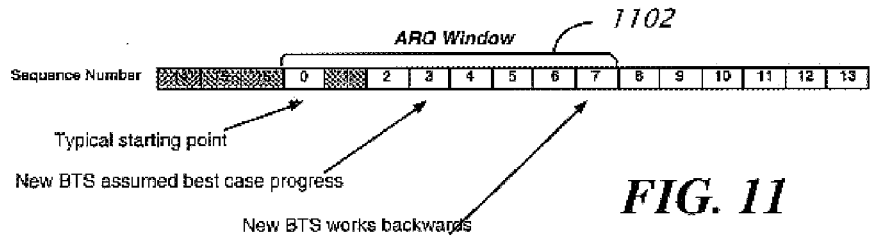
FIG. 11 shows three possible starting points for the scheduler within the ARQ window.

FIG. 11 shows three possible starting points for the scheduler 606 within the ARQ window. (Note that a selective repeat ARQ window of 8 and sequence space of 16 is unusually small and is shown for illustration only.)

1. Scheduler 606 works from oldest unacknowledged packet first (i.e. pkt#0, pkt#1, pkt#2, pkt#3). This 'typical' scheduler is almost guaranteed to send duplicate transmissions.

2. The new BTS 602 could calculate the best case progress of the old BTS 602 since the last acknowledgement received from the MS 402. The new serving BTS 602 could then jump ahead the maximum number of packets the old BTS 602 could have served during the mobile state lag. If the new BTS 602 has knowledge of the MCS level used at the old BTS, the calculation will be exact. In other cases, this calculation can be difficult and/or inaccurate.

3. The new serving BTS 602 could start working backward from the end of the ARQ window (i.e. pkt#7, pkt#6, pkt#5 etc), and when it receives an ACK it would resume working from the base of the window. For a large window, this can cause an unnecessarily large reordering buffer and could impact delay variance and the ability to support real-time services.

Two specific OTA implementation options are discussed below.

1) Complete Transfer of State—Mobiles send a complete acknowledgment (ACK) to the new serving BTS 602 with each change in serving cell selection. A complete ACK preferably contains a single packet sequence number and a bitmap identifying all packets received within the current ARQ window relative to the provided sequence number. This technique has the advantage that no backhaul updates are required. A disadvantage is that the complete ACK messages are fairly large and cannot be transmitted frequently).

2) Incremental Transfer of State—The MS 402 informs the BTS 602 of the last received packet number(s) periodically and not only during a cell switch. These periodic updates can be received every frame, some multiple of frames, or coincident with the ACK messages. The messages must be received by every BTS 602 in the active set. The updates are stored (cached) and used to construct the state when the cell switch occurs. This technique also has the advantage that no backhaul updates are required. Also, if the state messages are sent more frequently than the ACK messages, they consume only a few bits per reverse link message and are robust to the loss of an uplink message. A disadvantage is that the messages may require higher power to reach all BTS 602 in the active set.

The Backhaul and OTA solutions may be combined to improve the overall performance. Backhaul delays may be overcome by using OTA solution in the short term and a backhaul multicast in the long term. For example, the backhaul can be sent every N frames. In a complementary fashion, the required signaling bandwidth may be reduced through backhaul updates. The sequence numbers only need be unique over the period between backhaul updates and may be represented in fewer bits. In addition, the backhaul update would correct for any errors due to missed or erroneous mobile state transmissions.

Backhaul messaging may also be used to correct for the mobile state lag described in the previous section. The old serving BTS 602 could inform the new serving BTS 602 of the last packet completed. Assuming that the new BTS had leapt ahead to avoid packet duplication, the new BTS could then transmit any skipped packets between the old BTS's last completed packet and the initial packet transmitted after the FCSS handoff.

Dual channel hybrid ARQ is described in U.S. patent application Ser. No. 09/442,250 filed Nov. 17, 1999 by Cudak et al. The essential idea is to combine the strengths of stop-and-wait hybrid ARQ (capacity gain, low memory requirements) with full channel utilization. Fast feedback is required, necessitating the use of a distributed architecture.

Figure 12:
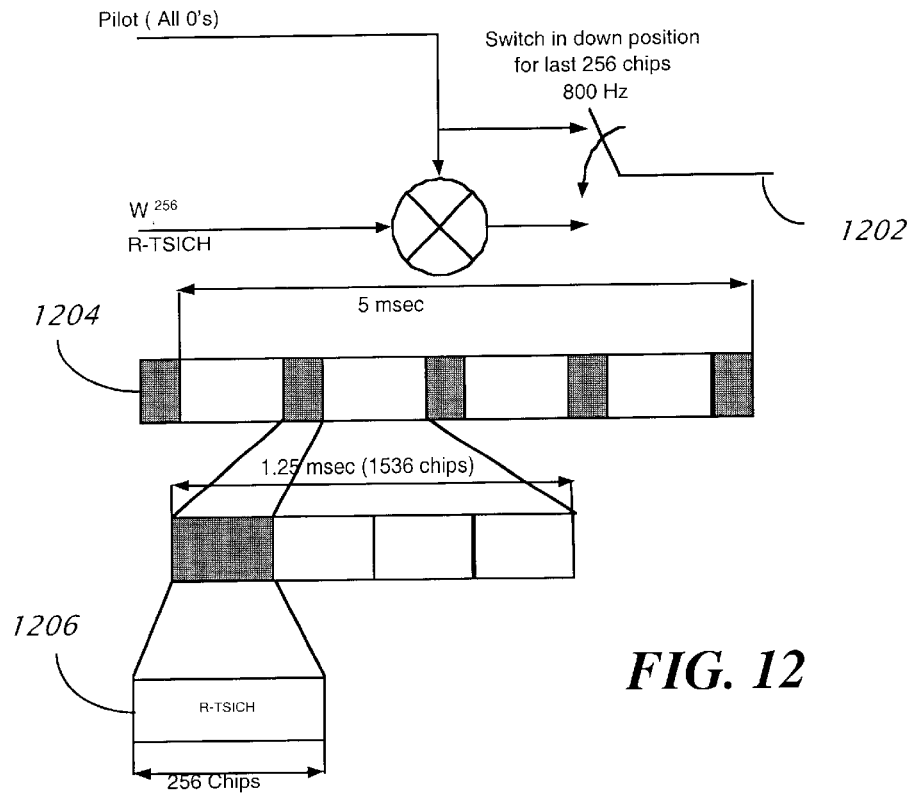
FIG. 12 depicts a structure of the Reverse Pilot Channel (R-PICH) and Reverse Transmit Sector Indicator Channel (R-TSICH), used in accordance with the present invention.

Briefly, in one embodiment, the MS.402 and BTSs 602 communicate with each other over the air using a CDMA air-interface. Data Packets are queued up at the CBSC 608 and are then distributed to the appropriate BTSs 602 connected to the CBSC. The structure of the Reverse Pilot Channel (R-PICH) and Reverse Transmit Sector Indicator Channel (R-TSICH) is shown in FIG. 12. The R-TSICH 1206 is a reverse link signal used to indicate the required sector from which the network should direct its data transmission to the mobile station. The last 256 R-PICH 1204 symbols of each power control group (i.e. 1.25 msec) are masked with the code corresponding to the R-TSICH at an output port 1202. Each sector in the network is identified by a unique code. These codes are chosen from a set of 256 orthogonal Walsh-Hadamard codes. The network recognizes the sector from which the data is requested by detecting the sector specific R-TSICH code. The masking of the R-TSICH is repeated every Power Control Group (PCG). Dual channel Stop-and-Wait ARQ offers a solution by parallelizing the stop-and-wait protocol and in effect running a separate instantiation of the ARQ protocol in the idle channels. As a result no system capacity goes wasted since one instance of the algorithm communicates a data block on the forward link at the same time that the other communicates an acknowledgment on the reverse link. In packet systems one often finds that a single user occupies the entire channel over a series of timeslots.

Figure 13:
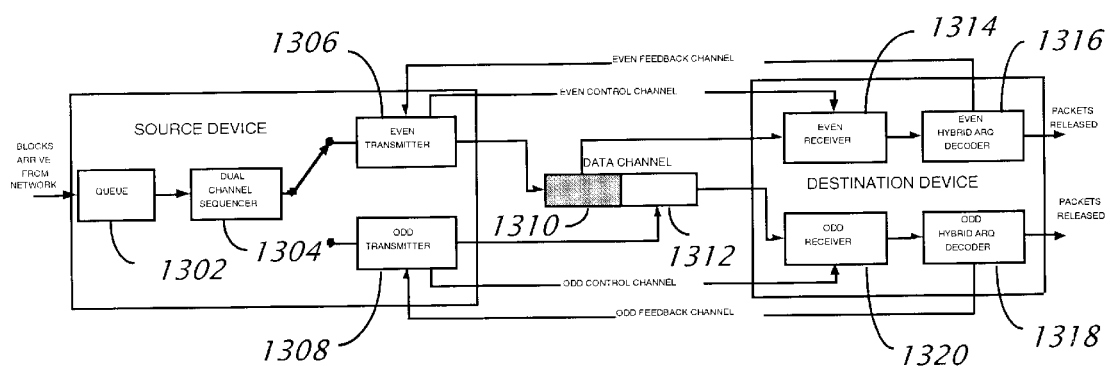
FIG. 13 is a block diagram of a dual-channel hybrid ARQ model in accordance with the present invention.

FIG. 13 is a block diagram of a dual-channel hybrid ARQ model in accordance with the present invention, and illustrates the case where a single user is using the channel. FIG. 13 models a system consisting of a single source and destination over a slotted data channel. The model divides the data channel into even and odd timeslots to identify the independent instances of the ARQ protocol. The even or odd state is signaled explicitly on the forward data channel (F-DCH). Data blocks arrive from the network and are queued in a queue 1302 at the source. The source then employs a dual-channel sequencer 1304 to admit data blocks to either the even transmitter 1306 or odd transmitter 1308. Once admitted, each transmitter 1306, 1308 performs a conventional stop-and-wait ARQ algorithm in its respective even 1310 or odd 1312 timeslot by transmitting the data block on the data channel and a sequence bit on the associated control channel. Similar to the source, the destination device contains both an odd receiver 1320 and an even receiver 1314 receiving blocks from the respective even 1310 and odd 1312 timeslots (a.k.a. 5 ms frames). Each receiver 1320, 1314 is coupled with an independent hybrid ARQ decoder 1316, 1318. The hybrid ARQ decoder signals the success (or failure) of the data block on a separate feedback channel. The hybrid ARQ decoders 1316, 1318 will store all symbols from unsuccessful attempts for the current sequence number. At most, one even set of symbols and one odd set of symbols are stored by the even and odd hybrid ARQ decoders 1316, 1318, respectively. Independent feedback channels exist to support each instance of the stop-and-wait. The feedback channel is scheduled on the reverse link in the frame immediately following the downlink transmission. In operation, the MS 402 preferably selects the sector from which it expects to receive packet data on the forward channel based on the link quality of its active set list. Each sector in the network is identified by a unique code. The BTS 602 recognizes the sector from which the data is requested by the MS 402 by detecting the sector-specific R-TSICH code. The queued packet data at the CBSC 608 is divided into odd and even packet data stream. The transmit slots at the BTS 602 are also divided into odd and even slots, and there is a one-to-one correspondence between the queued packet data and the transmit slots; i.e., the even-queued data is always transmitted from the even slots and the odd-queued data is always transmitted from the odd slots (or, alternatively, vice versa). It may be noted that the even packets may comprise one or a concatenation of several even packets and that the odd packets may comprise one or a concatenation of several odd packets. When one of the odd or even packets is decoded correctly, the MS 402 sends an immediate ACK to the corresponding BTS 602; otherwise, the packet will be retransmitted from the BTS 602 in the next corresponding odd or even slot. It may be noted that the ACK can be sent at higher power so that it can be decoded at multiple BTSs 602. In the event the ACK is sent by the MS 402 but not received by the BTS, the selected BTS 602 in the next instance resends the same packet. However, the MS 402 on receiving the packet discards the packet.

It is assumed that 0/1 sequence numbers are used with implicit even/odd based on the ACK timing. Alternatively, IP sequence numbers can be used when necessary. If a synchronization method causes a new packet transmission (or a retransmission using a different MCS) while an old packet is uncompleted, the hybrid ARQ state associated with the old packet must be flushed at the receiver. Special care must be taken with grouped packets under these circumstances.

In addition to providing the gains of hybrid ARQ, dual-channel hybrid ARQ advantageously is robust to MCS selection, requires a smaller sequence space reducing the amount mobile storage, requires less sequence number overhead than selective repeat ARQ, and eases duplicate detection (duplicates can be identified from the separately encoded header before channel decoding).

There are four methods of performing ARQ synchronization:

1. Abort—Abort both the even and odd packets and immediately switch both even and odd ARQ to the new cell.
2. Wait—Wait for both the even and odd packets to finish (complete or give up) before switching the even and odd ARQ to the new cell.
3. Stagger—Wait for the packet to finish before switching the ARQ to the new cell, but switch the even and odd ARQ independently.
4. Continue—Immediately switch the even and odd ARQ and continue both ARQ in the new cell.

The four methods above can be combined with the hybrid backhaul and OTA methods described herein above to achieve queue and ARQ synchronization. The preferred embodiment is to use the Stagger method as described herein below. An alternate preferred embodiment is to use the Continue method as also described herein below. The Abort method is not preferred as it wastes transmissions, lowering system capacity and increasing interference. The Wait method is not preferred as it may leave the channel idle when one of the ARQ (e.g., even) is finished and the other (e.g., odd) is not. Finally, an incremental state transfer called ARQ Mirroring will also be described herein below.

Figure 14:
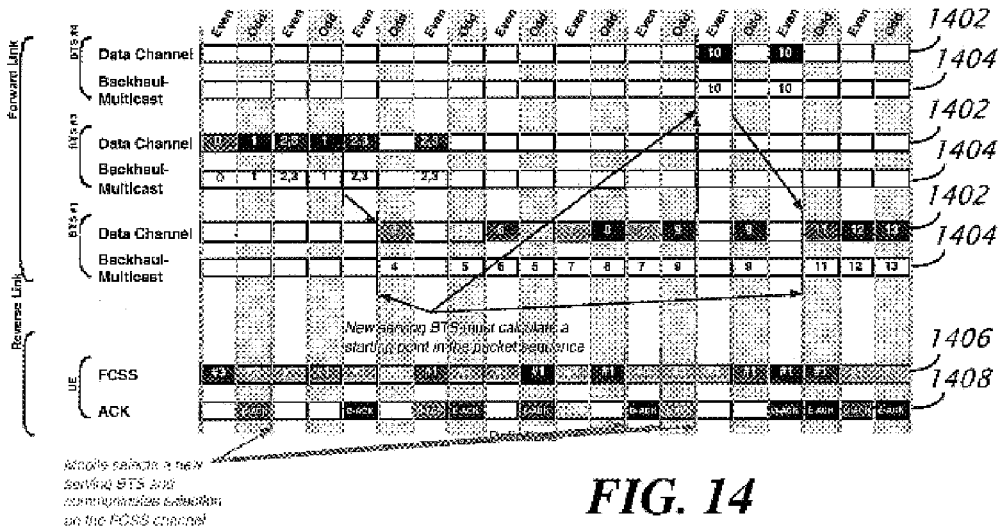
FIG. 14 illustrates a Stagger method for ARQ synchronization with backhaul multicast in accordance with the present invention.

FIG. 14 illustrates the Stagger method with backhaul multicast in accordance with the present invention. The Data Channel 1402 indicates packet data on the forward channel. The Backhaul Multicast 1404 indicates the current schedule sent to the active-set BTSs 602. FCSS 1406 selects the best cell two frames in advance. The ACK 1408 indicates the acknowledgments sent for the even and odd data. The Stagger method operates as follows:

1. During the cell or sector switch, the old and new BTS 602 both listen to the even and odd ACKs. The ACK will tell the new BTS that an ARQ has finished and that the channel is free to be used.
2. The new BTS 602 jumps to a next packet. The next packet is calculated based on the estimated grouping and success of the even and odd channels. If the calculated packet has already been successfully transmitted, the new packet is a repeat. If the calculated packet is further in the queue than the old cell will complete, a hole (several skipped packets) will be present.
3. An ARQ finishing triggers an additional backhaul message from the old BTS 602 to the new BTS 602 with the acknowledgement information. The backhaul message provides an exact, not calculated, queue state.

The benefit of this method is that it requires no more OTA signaling than the existing acknowledgement feedback. The disadvantage is that ACKs may have to be of somewhat higher power to be received by both BTSs 602 during handoff, and that the mobile lag adds uncertainty to the calculation.

Figure 15:
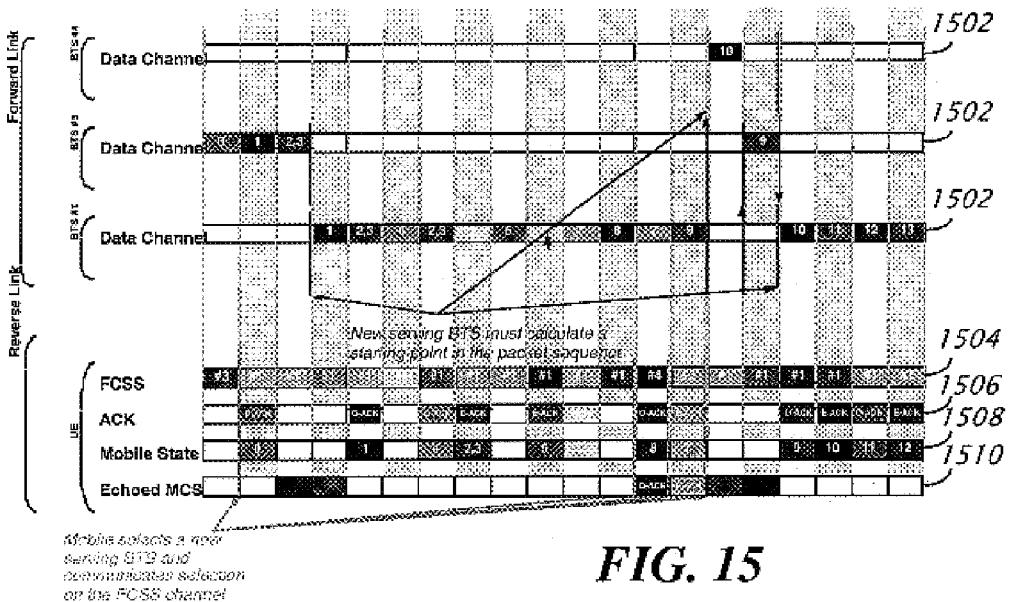
FIG. 15 illustrates a Continue method for ARQ synchronization using OTA signaling in accordance with the present invention.

FIG. 15 illustrates the Continue method using OTA signaling in accordance with the present invention. The Data Channel 1502 indicates the packet data on the forward channel. FCSS 1504 selects the best cell two frames in advance. The ACK 1506 indicates the mobile's acknowledgment of the odd and even channels. The Mobile State 1508 indicates the sequence number of the packet last received by the mobile. The Echoed MCS 1510 indicates the MCS assignment in the previous state. The Continue method operates as follows:

1. The Cell Site Switch message is accompanied by a message to inform the new BTS 602 of the last received packet sequence number and current frame assignment (e.g., MCS and number of multicodes). The new BTS can use this information to speculatively prepare a repeat of the current packet or a new packet (jump ahead).
2. During the switch, ACKs are directed at the new BTS. When an ACK is received, it triggers one of the speculative choices (retry or new packet).
3. Once hand-off is complete and a backhaul message is received, any holes from the jump ahead can be backfilled.

An advantage is that communication with the old BTS 602 can be immediately terminated without performance loss in situations where the old BTS is lost suddenly due to mountains, buildings, intersections, etc. Another advantage is that the method is not as dependent on the backhaul. A third advantage is that the extra messaging need only be present during a cell switch. A disadvantage is that any uncertainty will cause the new assignment to disagree with the old, and a possible loss of packets.

Yet another synchronization method is ARQ mirroring. In this method, all BTSs 602 in the active set preferably are initially and periodically synchronized through backhaul updates. Synchronization between updates is achieved by having each BTS in the active set mirror the Radio Link Control (RLC) of the current BTS. All BTSs in the active set receive the ACK from a successful packet, and update their state accordingly. Only the current BTS transmits. A higher power ACK may have to be used. Loss of synchronization is handled by the well-known duplicate detection procedure.

Figure 16:
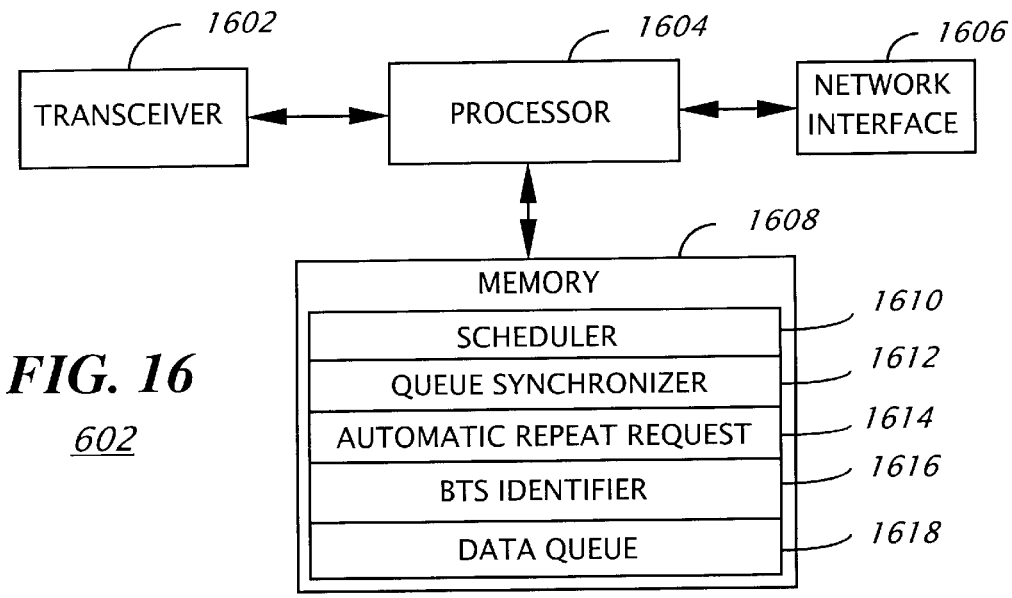
FIG. 16 is an exemplary electrical block diagram depicting a BTS 602 in accordance with the present invention.

FIG. 16 is an exemplary electrical block diagram depicting the BTS 602 in accordance with the present invention. The BTS 602 comprises a transceiver 1602 for receiving a message from the MS 402, the message indicating a selection by the MS 402 of a preferred cell site to be used for transmitting a frame of data to be sent subsequently to the MS 402. The BTS 602 further comprises a processor 1604 coupled to the transceiver 1602 for processing the message and for controlling the transceiver 1602, the processor 1604 coupled to a memory 1608 for storing a data queue 1618. The BTS 602 further comprises a network interface 1606 coupled to the processor 1604 for communicating with the CBSC 608. The memory 1608 comprises a scheduler program 1610 for programming the processor 1604 to schedule, when the base station 602 is the base station of the preferred cell site, a transmission of the frame of data, wherein parameters for the transmission are determined by the processor 1604, in cooperation with the transceiver 1602, from recently-measured channel and interference information, gathered through well-known techniques. The memory 1608 also includes a queue synchronizer 1612 for programming the processor 1604 to synchronize the data queue 1618 to reflect the transmission of the frame of data, when the base station 602 is not the base station of the preferred cell, but is a member of an active set of base stations associated with the mobile station 402, in response to being informed that the frame of data has been received by the mobile station 402. In one embodiment, the memory 1608 further includes an automatic repeat request program 1614 for programming the processor 1604 to cooperate with the transceiver 1602 and the mobile station 402 to provide an automatic repeat request function in accordance with the present invention. The memory 1608 also includes a BTS identifier 1616 for uniquely identifying the base station 602.

Figure 17:
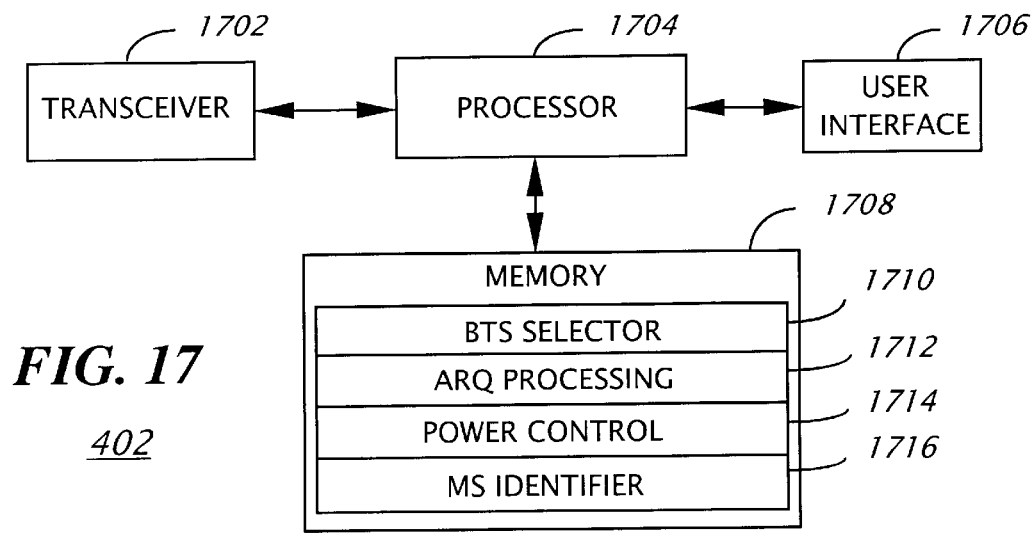
FIG. 17 is an exemplary electrical block diagram depicting a mobile station 402 in accordance with the present invention.

FIG. 17 is an exemplary electrical block diagram depicting the mobile station 402 in accordance with the present invention. The MS 402 comprises a transceiver 1702 for making transmission quality measurements of signals transmitted from the plurality of cell sites, the measurements made through well-known techniques. The MS 402 further comprises a processor 1704 coupled to the transceiver 1702 for processing the transmission quality measurements to make a selection of a preferred cell site for transmitting a frame of data to be sent subsequently to the mobile station 402, wherein the processor 1704 is programmed to transmit the selection to at least one of an active set of base stations 602 associated with the mobile station 402 at ones of the plurality of cell sites. The MS 402 also preferably comprises a user interface 1706 for interfacing with a user through well-known techniques. The MS 402 also includes a memory 1708 coupled to the processor 1704 for storing software and variables utilized in accordance with the present invention. The memory 1708 comprises a BTS selector 1710 for programming the processor 1704 to select the best BTS 602, as described above. The memory 1708 also includes an ARQ processing program 1712 for programming the processor 1704 to cooperate with the transceiver to participate in an automatic repeat request function and to send an acknowledgment to at least the base station of the preferred cell site, in response to a correctly decoded data packet. In addition, the MS 402 includes a power control program 1714 for programming the processor 1704 to transmit the selection of the best BTS 602 at a power sufficient for reception of the selection by at least one of the active set of base stations associated with the mobile station 402, and to transmit the acknowledgment at a power sufficient for reception of the acknowledgment by at least one of the active set of base stations 602 associated with the mobile station 402. The memory also includes an MS identifier 1716 for identifying the MS 402.

Figure 18:
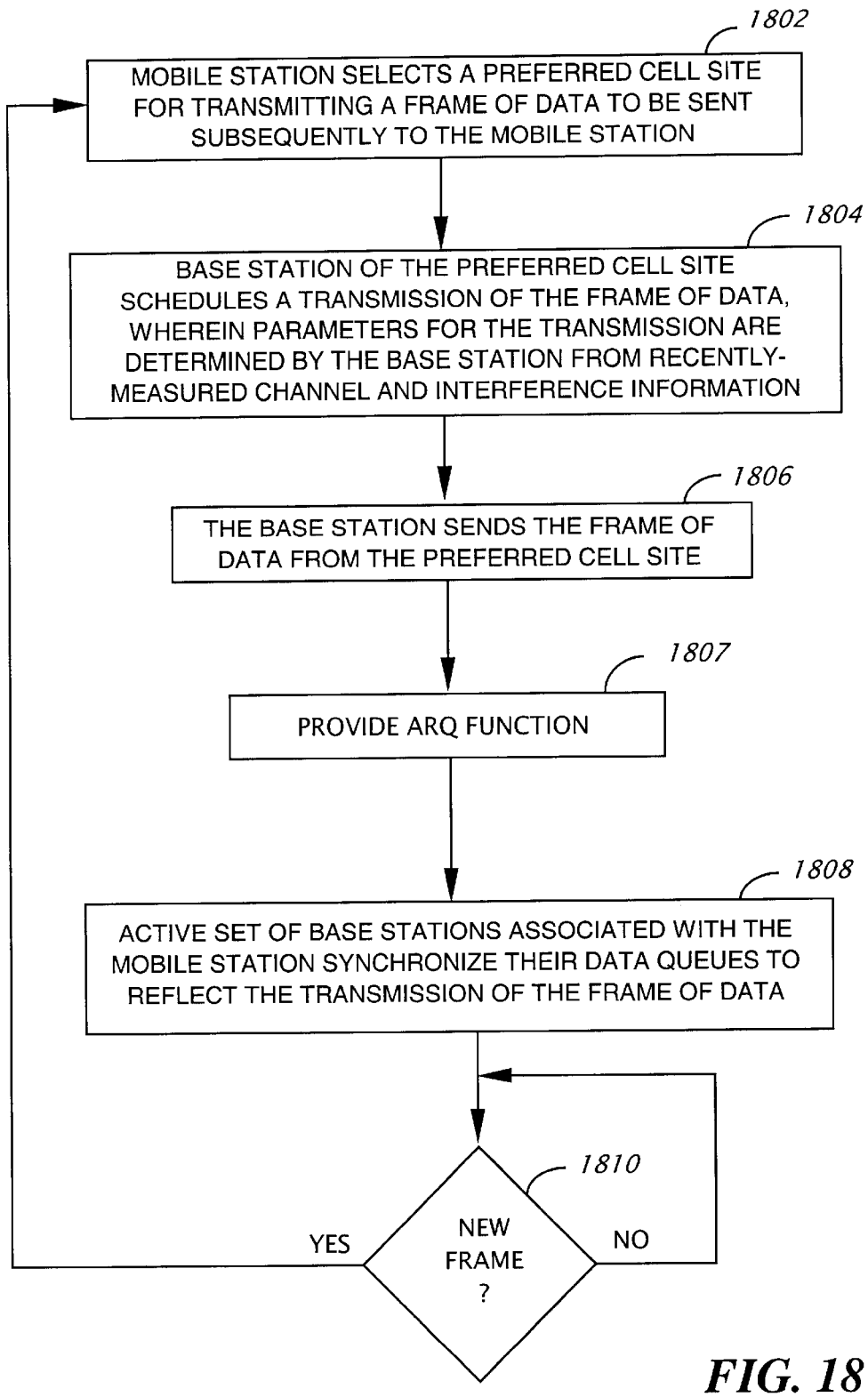
FIG. 18 is a flow diagram depicting operation of the distributed architecture digital wireless communication system in accordance with the present invention.

FIG. 18 is a flow diagram depicting operation of the distributed architecture digital wireless communication system in accordance with the present invention. The flow begins when the mobile station 402 selects 1802 a preferred cell site for transmitting a frame of data to be sent subsequently to the mobile station. To do this, the mobile station 402 preferably monitors transmissions of the active set of base stations 602 associated with the mobile station during the current frame of data to determine the preferred cell site for transmitting the frame of data to be sent subsequently to the mobile station; and identifies the preferred cell site through a reverse link transmission from the mobile station to at least one base station of the active set.

Next, the base station 602 of the preferred cell site schedules 1804 a transmission of the frame of data, wherein parameters for the transmission, e.g., transmission rate, modulation and coding scheme level, and number of multicodes, are determined by the base station from recently-measured channel and interference information, e.g., carrier-to-interference ratio, received signal strength, or bit error rate. Thereafter, the base station 602 sends 1806 the frame of data from the preferred cell site. With each frame of data, an ARQ function is provided. In one embodiment, the ARQ function is centralized, e.g., performed in the CBSC 404 through well-known techniques. In this embodiment, the ARQ function is preferably a selective repeat ARQ function.

In another embodiment, the ARQ function is distributed and is provided at the base stations 602, advantageously reducing feedback delay. In this embodiment, the base stations 602 in the active set preferably monitor an uplink transmission from the mobile station 402 to detect an ARQ acknowledgment. Preferably, the mobile station 402 returns an ARQ acknowledgment which includes a report of at least one of a modulation and coding level, a number of multicodes, and a packet number used by the base station 602 of the preferred cell site while sending the forward link transmission. In one embodiment, the mobile station 402 returns an ARQ acknowledgment which is transmitted at a sufficient power level to be received by all the base stations 602 of the active set.

A technique for performing the ARQ function at the base station is to perform the ARQ function through a dual-channel hybrid ARQ technique in which odd and even frames of data are processed in separate ARQ channels to generate even and odd ARQ functions; and, when switching from a current cell to a new cell, separately switching the even and odd ARQ functions after a corresponding current even or odd packet finishes, including calculating a starting packet sequence number in the new cell from an estimated grouping and success of transmissions of the current cell. An alternative technique for performing the ARQ function is to perform the ARQ function through a dual-channel hybrid ARQ technique in which odd and even frames of data are processed in separate ARQ channels to generate even and odd ARQ functions; and, when switching from a current cell to a new cell, immediately switching the even and odd ARQ functions, and continuing the even and odd ARQ functions in the new cell. Still another technique for providing the ARQ function at the base stations 602 is to perform the ARQ function through a dual-channel hybrid ARQ technique in which odd and even frames of data are processed in separate ARQ channels to generate even and odd ARQ functions; and to synchronize the base stations in the active set of the mobile station 402 initially and periodically through backhaul updates; and to mirror, by the base stations in the active set, a radio link control status of the base station of the preferred cell site between the backhaul updates.

It will be appreciated that, for handling multiple mobile station connections simultaneously by one base station, the base station can perform the ARQ function through an n-channel hybrid ARQ technique in which n frames of data are processed in separate ARQ channels to generate n ARQ functions, and, when switching from a current cell to a new cell, separately switching each of the n ARQ functions after a corresponding current packet of a given set finishes, including calculating a starting packet sequence number in the new cell from an estimated grouping and success of transmissions of the current cell. Alternatively, the ARQ function can be provided by performing the ARQ function through an n-channel hybrid ARQ technique in which n frames of data are processed in separate ARQ channels to generate n ARQ functions, and, when switching to a new cell, immediately switching each of the n ARQ functions, and continuing the n ARQ functions in the new cell. Still another technique for providing the ARQ function is performing the ARQ function through an n-channel hybrid ARQ technique in which n frames of data are processed in separate ARQ channels to generate n ARQ functions; synchronizing the base stations in the active set of the mobile station initially and periodically through backhaul updates; and mirroring, by the base stations in the active set, a radio link control status of the base station of the preferred cell site between the backhaul updates.

Referring again to FIG. 18, the active set of base stations 602 associated with the mobile station 402 synchronize 1808 their data queues to reflect the transmission of the frame of data. In one embodiment, queue synchronization is accomplished by communicating, via backhaul multicast from the base station 602 of the preferred cell site, a state of the base station's queue to other base stations in the active set of the mobile station 402. In another embodiment, queue synchronization is accomplished by communicating, from the mobile station 402 to at least one of the base stations 602 in the active set of the mobile station, information about recent transmissions received by the mobile station. The MS 402 checks 1810 whether it is time to select a BTS 602 for a new frame of data. If not, the MS continues to check. When it is time to select a BTS 602 for a new frame of data, the flow returns to step 1802.

It should be clear from the preceding disclosure that the present invention comprises a method and apparatus for providing a distributed architecture digital wireless communication system. In one embodiment, the present invention advantageously allows a scheduling function to be moved to the edge of the network to eliminate backhaul delay, thereby enabling the BTS to use the most recent channel information for scheduling. In another embodiment, the present invention advantageously allows an ARQ function also to be moved to the edge of the network, thereby reducing the ARQ delay, which greatly reduces the MS memory required for traditional selective-repeat ARQ methods, especially with Hybrid ARQ.

Many modifications and variations of the present invention are possible in light of the above teachings. Thus, it is to be understood that, within the scope of the appended claims, the invention can be practiced other than as specifically described herein above.

What is claimed is:

1. A method for providing a distributed architecture digital wireless communication system including a mobile station and a plurality of cell sites, the method comprising the steps of:

selecting by the mobile station a preferred cell site for transmitting a frame of data to be sent subsequently to the mobile station;

scheduling, by a base station of the preferred cell site, a transmission of the frame of data, wherein parameters for the transmission are determined by the base station from recently-measured channel and interference information;

thereafter, sending the frame of data from the preferred cell site; and synchronizing a data queue by an active set of base station associated with the mobile station to reflect the transmission, of the frame of data.

2. The method of claim 1, further comprising the step of providing a centralized Automatic Repeat reQuest (ARQ) function.

3. The method of claim 2 wherein the providing step comprises the step of providing a selective repeat ARQ function.

4. The method of claim 1, wherein the synchronizing step comprises the step of communicating, via backhaul multicast from the base station of the preferred cell site, a state of the base station's queue to other base stations in the active set of base stations associated with the mobile station.

5. The method of claim 1, wherein the synchronizing step comprises the step of communicating, from the mobile station to at least one of the base stations in the active set of base stations associated with the mobile station, information about recent transmissions received by the mobile station.

6. The method of claim 1, wherein the selecting step comprises the steps of:

monitoring transmissions of the active set of base stations associated with the mobile station during a current frame of data to determine the preferred cell site for transmitting the frame of data to be sent subsequently to the mobile station; and identifying the preferred cell site through a reverse link transmission.

7. The method of claim 1, further comprising the step of providing at the base stations an Automatic Repeat reQuest (ARQ) function, thereby reducing ARQ feedback delay.

8. The method of claim 7, further comprising in the active set of base stations the step of monitoring an uplink transmission from the mobile station to detect an ARQ acknowledgment.

9. The method of claim 7, wherein the providing step comprises the steps of:

performing the ARQ function through a dual-channel hybrid ARQ technique in which odd and even frames of data are processed in separate ARQ channels to generate even and odd ARQ functions; and when switching from a current cell to a new cell, separately switching the even and odd ARQ functions after a corresponding current even or odd packet finishes.

10. The method of claim 9, wherein the step of separately switching the even and odd ARQ functions comprises the step of calculating a starting packet sequence number in the new cell from an estimated grouping and success of transmissions of the current cell.

11. The method of claim 7, wherein the providing step comprises the steps of:

performing the ARQ function through a dual-channel hybrid ARQ technique in which odd and even frames of data are processed in separate ARQ channels to generate even and odd ARQ functions, and when switching from a current cell to a new cell, immediately switching the even and odd ARQ functions, and continuing the even and odd ARQ functions in the new cell.

12. The method of claim 7, wherein the providing step comprises the steps of:

performing the ARQ function through a dual-channel hybrid ARQ technique in which odd and even frames of data are processed in separate ARQ channels to generate even and odd ARQ functions;

synchronizing the active set of base stations associated with the mobile station initially and periodically through backhaul updates; and mirroring, by the base stations in the active set, a radio link control status of the base station of the preferred cell site between the backhaul updates.

13. The method of claim 7, wherein the providing step comprises the steps of:

performing the ARQ function through an n-channel hybrid ARQ technique in which n frames of data are processed in separate ARQ channels to generate n ARQ functions, and when switching from a current cell to a new cell, separately switching each of the n ARQ functions after a corresponding current packet of a given set finishes.

14. The method of claim 13, wherein the step of separately switching each of the n ARQ functions comprises the step of calculating a starting packet sequence number in the new cell from an estimated grouping and success of transmissions of the current cell.

15. The method of claim 7, wherein the providing step comprises the steps of:
- performing the ARQ function through an n-channel hybrid ARQ technique in which n frames of data are processed in separate ARQ channels to generate n ARQ functions, and
- when switching to a new cell, immediately switching each of the n ARQ functions, and continuing the n ARQ functions in the new cell.

16. The method of claim 7, wherein the providing step comprises the steps of:
- performing the ARQ function through an n-channel hybrid ARQ technique in which n frames of data are processed in separate ARQ channels to generate n ARQ functions;
- synchronizing the active set of base stations associated with the mobile station initially and periodically through backhaul updates; and
- mirroring, by the base stations in the active set, a radio link control status of the base station of the preferred cell site between the backhaul updates.

17. The method of claim 7, wherein the mobile station returns an ARQ acknowledgment which includes a report of at least one of a modulation and coding level, a number of multicodes, and a packet number used by the base station of the preferred cell site while sending the transmission.

18. The method of claim 7, wherein the mobile station returns an ARQ acknowledgment which is transmitted at a sufficient power level to be received by at least one of the active set of base stations associated with the mobile station.

19. A base station for use in a distributed architecture digital wireless communication system including a mobile station and a plurality of cell sites, the base station comprising:
- a transceiver for receiving a message from the mobile station, the message indicating a selection by the mobile station of a preferred cell site to be used for transmitting a frame of data to be sent subsequently to the mobile station;
- a processor coupled to the transceiver for processing the message and for controlling the transceiver, the processor coupled to a memory for storing a data queue; and
- a network interface coupled to the processor for communicating with a controller of the wireless communication system, wherein the processor is programmed to:
- schedule, when the base station is the base station of the preferred cell site, a transmission of the frame of data, wherein parameters for the transmission are determined by the processor, in cooperation with the transceiver, from recently-measured channel and interference information; and
- synchronize the data queue to reflect the transmission of the frame of data, when the base station is not the base station of the preferred cell site, but is a member of an active set of base stations associated with the mobile station, in response to being informed that the frame of data has been received by the mobile station.

20. The base station of claim 19, wherein the processor is further programmed to cooperate with the transceiver and the mobile station to provide an automatic repeat request function.

21. A mobile station for use in a distributed architecture digital wireless communication system including a plurality of base stations communicating at a plurality of cell sites, the mobile station comprising:
- a transceiver for making transmission quality measurements of signals transmitted from the plurality of cell sites; and
- a processor for processing the transmission quality measurements to make a selection of a preferred cell site for transmitting a frame of data to be sent subsequently to the mobile station, wherein the processor is programmed to transmit the selection to of an active set base station associated with the mobile station, wherein the active set base station synchronizes a data queue to reflect the transmission of the frame of data has been inserted.

22. The mobile station of claim 21, wherein the processor is further programmed to transmit the selection at a power sufficient for reception of the selection by at least one of the active set of base stations associated with the mobile station.

23. The mobile station of claim 21, wherein the processor is further programmed to:
- cooperate with the transceiver to participate in an automatic repeat request function and to send an acknowledgment to at least a base station of the preferred cell site, in response to a correctly decoded data packet.

24. The mobile station of claim 23, wherein the processor is further programmed to transmit the acknowledgment at a power sufficient for reception of the acknowledgment by at least one of the active set of base stations associated with the mobile station.

* * * * *